(12) United States Patent
Cutajar

(10) Patent No.: US 8,638,920 B2
(45) Date of Patent: Jan. 28, 2014

(54) CALL ROUTING MONITORING, CONTROL AND REPORTING

(75) Inventor: Louis Cutajar, Woodstock, GA (US)

(73) Assignee: Cox Communications, Inc., Atlanta, GA (US)

( * ) Notice: Subject to any disclaimer, the term of this patent is extended or adjusted under 35 U.S.C. 154(b) by 254 days.

(21) Appl. No.: 12/843,277

(22) Filed: Jul. 26, 2010

(65) Prior Publication Data

US 2012/0020472 A1    Jan. 26, 2012

(51) Int. Cl.
*H04M 3/42* (2006.01)

(52) U.S. Cl.
USPC ............... 379/207.16; 379/372; 379/373.01; 379/373.02; 379/373.03; 379/373.04

(58) Field of Classification Search
USPC ......................... 379/265.01–266.09
See application file for complete search history.

(56) References Cited

U.S. PATENT DOCUMENTS

| | | | |
|---|---|---|---|
| 6,118,861 A * | 9/2000 | Gutzmann et al. ....... | 379/201.01 |
| 2002/0106071 A1* | 8/2002 | Uppaluru et al. ........ | 379/265.02 |
| 2004/0151296 A1* | 8/2004 | Gamble ................... | 379/218.01 |
| 2005/0094799 A1* | 5/2005 | Elsey ...................... | 379/266.04 |
| 2006/0098583 A1* | 5/2006 | Baker et al. ............. | 370/252 |
| 2008/0091516 A1* | 4/2008 | Giunta .................... | 705/10 |
| 2011/0002453 A1* | 1/2011 | Finkle .................... | 379/133 |
| 2011/0055251 A1* | 3/2011 | Baumeister et al. ..... | 707/769 |

* cited by examiner

*Primary Examiner* — Joseph J Nguyen

(74) *Attorney, Agent, or Firm* — Merchant & Gould

(57) ABSTRACT

Management of call center call routing is provided. Service calls directed to a call center may be monitored according to a variety of parameters such as associated line of business, date, time, and call volume. Calls directed to an internal call center may be routed to an alternate call center for processing as required or needed by the provider of the internal call center. For each type of incoming service call, a maximum call count or percentage-based call count may be established to facilitate efficient routing of service calls to the internal call center or to an alternate call center to ensure that no more than a specified number of calls are routed to a given call center. Real time and summary reporting may be generated to allow call center management personnel to monitor and manage service call routing to one or more internal and/or alternate call centers.

20 Claims, 5 Drawing Sheets

Call Count Executive Summary Report

Application Functions

City or Operating Area
Call Count Executive Summary Report

| Line of Business | Date | Total Calls Sent | Total Calls Passed thru Application | % of Total Calls Sent | Last Nth Setting for Day | Last Max Setting for Day | Time Max Setting was Reached |
|---|---|---|---|---|---|---|---|
| Billing | 3/15/2010 | 3 | 7 | 42.86% | 0 | 0 | Max Limit Not Reached |
|  | 3/16/2010 | 3 | 5 | 60.00% | 2 | 3 | 8:14:16AM |
|  | 3/17/2010 | 0 | 1 | 0.00% | 2 | 3 | Max Limit Not Reached |
|  |  | 6 | 13 | 46.15% |  |  |  |
| Data Tech |  |  |  |  |  |  |  |
|  | 3/14/2010 | 1 | 1 | 100.00% | 0 | 0 | Max Limit Not Reached |
|  | 3/16/2010 | 0 | 1 | 0.00% | 2 | 3 | Max Limit Not Reached |
|  | 3/17/2010 | 500 | 1,000 | 50.00% | 10 | 750 | Max Limit Not Reached |
|  |  | 501 | 1,002 | 50.00% |  |  |  |
| Telephone Tech |  |  |  |  |  |  |  |
|  | 3/16/2010 | 0 | 1 | 0.00% | 2 | 3 | Max Limit Not Reached |
|  |  | 0 | 1 | 0.00% |  |  |  |
| Video Tech |  |  |  |  |  |  |  |
|  | 3/16/2010 | 0 | 1 | 0.00% | 2 | 3 | Max Limit Not Reached |
|  |  | 0 | 1 | 0.00% |  |  |  |
| Grand Total |  | 507 | 1,017 | 49.85 |  |  |  |

FIG. 3

CALL ROUTING MONITORING, CONTROL AND REPORTING

BACKGROUND

The service call center has become an important aspect of the purchase and use of goods and services. In a typical setting, a provider of a service, for example, telephone services, cable television services, data services, and the like, operates or utilizes one or more call centers to receive and process calls from customers/subscribers regarding service offerings and/or service problems/needs. Similarly, a provider of a particular good, for example, computers, may operate or utilize one or more call centers to allow customers to receive help with purchased items/systems. In many such cases, a provider of goods or services may operate an internal call center for handling service calls, but the provider may contract with a third party call center to handle some or all of the service calls based on call volume and needs. For example, a provider of telecommunications services may handle a number of service calls via an internal call center, but the service provider may contract with a third party call center to handle a number of service calls, for example, 500 service calls per day, in order to relieve the service provider from the necessity of hiring additional internal call center staff or from investing in additional internal call center systems. In such arrangements, a substantial penalty may be assessed to the service provider for calls routed to the third party call center in excess of the contracted volume (e.g., 500 calls). Similarly, when a service provider fails to maximize calls routed to the third party call center (i.e., less than the contracted volume), then the service provider fails to maximize utilization of the contracted call volume, and thus, spends more on the third party call center contract than is necessary.

It is with respect to these and other considerations that the present invention has been made.

SUMMARY

Embodiments of the present invention solve the above and other problems by providing monitoring, reporting, and controlling of service calls placed to a call center. According to aspects of the invention, service calls directed to a call center may be monitored according to a variety of parameters such as associated line of business, date, time, and call volume. Such calls directed to an internal call center of a goods or services provider may be routed to an alternate or third party call center for processing as required or needed by the operator of the provider's primary or internal call center based on a variety of factors, including but not limited to, primary call center staffing levels, periodic volume levels, costs, technical capabilities of the primary and alternate call centers, and the like.

For each type of incoming service call, a maximum call count or percentage-based call count may be established to facilitate efficient routing of service calls to the primary call center or to an alternate call center to ensure that no more than a specified number of calls are routed to a given call center. A real time call routing report may be generated as calls are routed to primary and/or alternate call centers to allow for monitoring of call processing, real time trending review and analysis, and to allow for on-the-fly changes to call routing instructions based on real time call routing data. An executive summary report may be generated to show call routing data over a specified period of time, and a real time canvas report may be generated to show calls routed versus total calls received or total calls passed through an associated call routing control system. Accordingly, through aspects and embodiments of the invention, users may track and trend service call routing and may guarantee precise numbers of calls are routed to specified call centers.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3 illustrates an example computer-generated display of a call count executive summary report.

DETAILED DESCRIPTION

Figure 1:
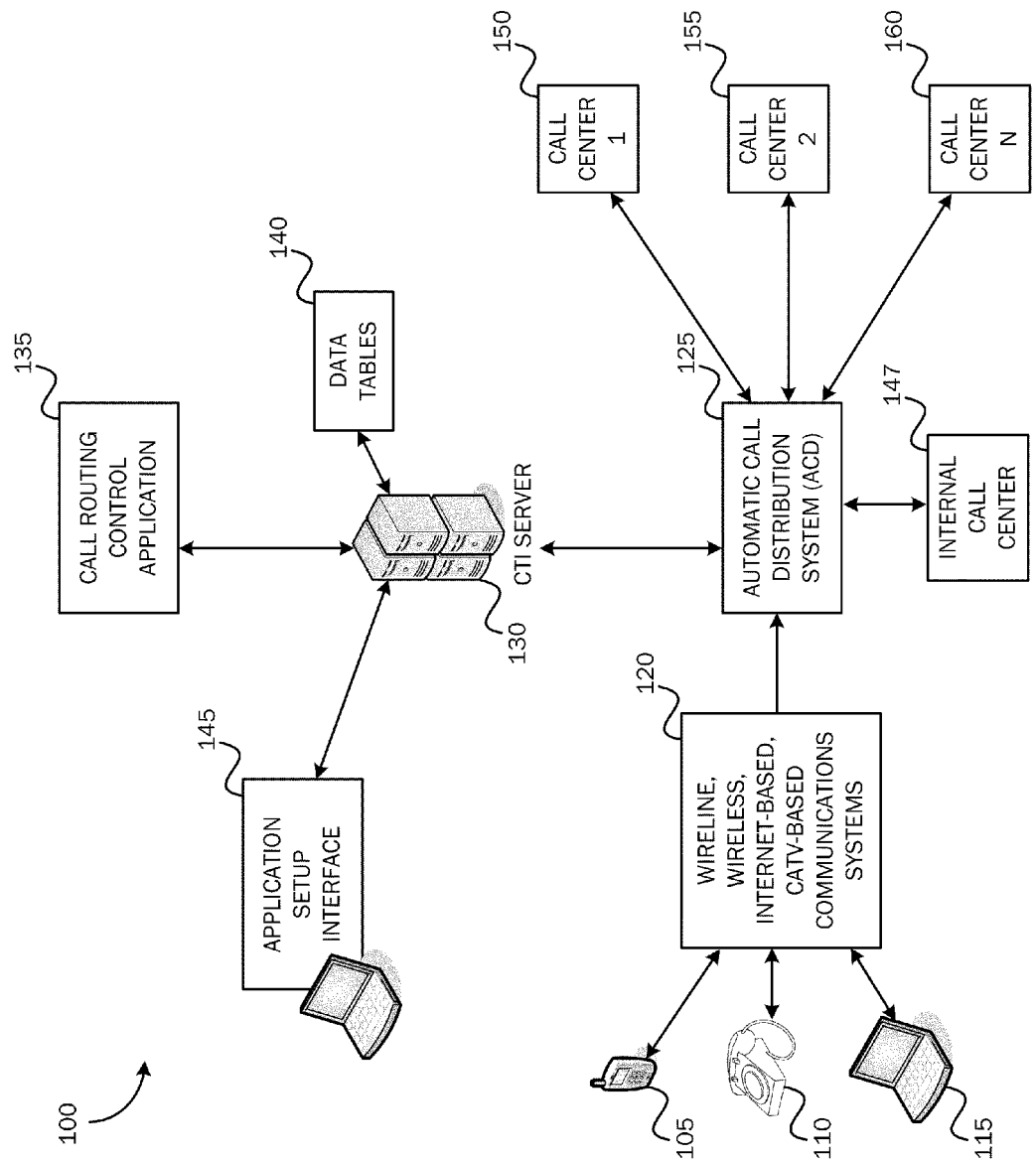
FIG. 1 is a simplified block diagram illustrating a system architecture in which embodiments of the present invention may be practiced.

As briefly described above, embodiments of the present invention are directed to monitoring, controlling, and reporting call center call routing. Service calls directed to a call center may be monitored according to a variety of parameters such as associated line of business, date, time, and call volume. Calls directed to an internal call center may be routed to an alternate call center for processing as required or needed by the provider of the internal call center. For each type of incoming service call, a maximum call count or percentage-based call count may be established to facilitate efficient routing of service calls to the internal call center or to an alternate call center to ensure that no more than a specified number of calls are routed to a given call center. Real time and summary reporting may be generated to allow call center management personnel to monitor and manage service call routing to one or more internal and/or alternate call centers.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is a simplified block diagram illustrating a system architecture in which embodiments of the present invention may be practiced. As described herein, providers of goods and/or services often provide access by customers/subscribers to primary/internal or alternate/third party call centers for receiving information about goods or services including help information, use information, repair information, problem reporting, and the like. As should be appreciated, each different type of line of business for which provision of call center services may be provided may be associated with varying levels of call center usage. For example, a provider of telephone services may receive 1,000 calls per day to an internal or third party call center for answering questions about provided telephone services. A provider of data services, for example, internet connectivity services, may receive 10,000 calls per day for questions about provided data services. A cable television services provider may similarly receive hundreds or thousands of calls per day regarding cable television service offerings, services outages, services availability, and the like. A provider of goods, for example, computers, electronics, software products, hardware products, etc., may similarly receive many calls per day that must be routed to an internal or third party call center for providing information associated with those goods.

In addition to receiving incoming calls related to use, repair, maintenance, and the like associated with particular goods and services, providers of goods and services may also receive incoming calls associated with business and transactional items, for example, billing, purchasing, delivery, and the like. Indeed, as should be appreciated, embodiments of the present invention may be applied to any line of business type for which an incoming call may be received that must be routed to an internal or third party call center for processing.

Referring still to FIG. 1, a variety of communications means, for example, a hand held wireless communication device 105, a wire line telephone 110, a computer 115 may be utilized by a purchaser/subscriber of goods or services to communicate over a wireless, wire line, Internet-based, cable television-based communication system, or any other available communications means 120 to an automatic call distribution system (ACD) 125 operated by the provider of the applicable goods or services. For example, the ACD 125 may be a communications receiving system at a business headquarters for receiving incoming service related calls that must be routed to an internal or third party call center for processing.

As is appreciated by those skilled in the art, the ACD 125 may be a device or system used for distributing incoming calls to a group of terminals at an internal call center 147 operated by the receiving goods or services provider, or the ACD 125 may be utilized for distributing incoming calls to one or more terminals operated at alternate call centers 150, 155, 160. The ACD 125 may include hardware, software, switches, phone lines, and routing technology for routing incoming calls to one of the call centers 147, 150, 155, 160 according to one or more call routing procedures. Call routing procedures may be based on a number of factors including, day/time of call receipt, technology associated with incoming call, location of the source of the incoming call, and the like. In addition, the automatic control distribution center 125 may utilize an interactive voice response system for gathering information from an incoming caller that may be utilized to assist in the routing of the incoming service call. For example, a simple call routing procedure may route all calls received at the ACD 125 after the close of business of the associated goods or services provider to an alternate or third party call center 150 rather than routing the calls to the internal call center 147 associated with the provider of the goods or services. In a more complex manner, if information gathered by an interactive voice response system from an incoming caller indicates that an incoming call is associated with a particular technology, for example, computer hardware troubleshooting, such a call may be automatically routed to an alternate call center 155 hired by the receiver of the incoming call to handle and process all incoming service calls related to computer hardware troubleshooting issues.

Many different call routing procedures and arrangements may be created for most efficiently utilizing the services and systems of the provider's internal call center 147 in association with the services and systems offered by third party call centers 150, 155 and 160. For example, in a most basic form, a receiver of incoming services calls may simply need to route all calls in excess to a number that may be handled by its internal call center 147 to a third party call center. That is, if the goods/services provider has facilities, personnel, and systems capable of handling 5,000 incoming service calls per day, then the goods/services provider may need to contract with an alternate or third party call center 150, 155, 160 to handle all incoming service calls in excess of 5,000 calls per day.

According to a typical contract between a goods/services provider and a third party call center operator, the third party call center operator may agree to handle a specified number of service calls for an agreed price. For example, the goods/services provider may contract with a third party call center 150 to handle up to 1,000 service calls per day for a specified price. Typically, if calls below the maximum number of contracted service calls are passed to the third party call center operator, the receiving goods/service provider does not receive a refund or rebate on the agreed price. Similarly, if calls in excess of the specified agreed number, for example, 1,000 calls, are passed to the third party call center 150, a substantial cost penalty may be applied to each call passed to the third party call center in excess of the agreed number of calls. Thus, it is important for the receiving goods/services provider that the maximum number of calls provided in the third party call center contract be passed to the third party call center to maximize the value of the call processing contract, and it is important that the goods/services provider not exceed the specified number of calls that may be passed to the third party call center to avoid excess call penalties.

Referring still to FIG. 1, according to embodiments of the present invention, systems and methods are provided for allowing a goods/services provider to monitor, report, analyze, and control routing of calls to an internal call center 147 or to one or more third party call centers 150, 155, 160. When a call is received at the ACD 125 for routing to one or more call centers, prior to routing the incoming call, a query may be passed to a computer telephony integration (CTI) server 130 for receiving any special call routing instructions for the incoming call. According to embodiments, a call routing control application 135 may reside on the CTI server 130 for monitoring, reporting and controlling call routing to one or more call centers.

For each line of business type, for example, video services, telephony services, data services, product help services, and the like, one or more data tables 140 may be generated for storing information associated with incoming service calls for associated line of business types. For example, for a line of business type of video technology services, a data table 140 may be generated for storing information on all incoming video technology service calls that may be utilized for determining a most efficient service call routing instruction to be applied to each incoming service call for video technology services.

According to embodiments, if a goods/services provider contracts with a third party call center for processing a given number of calls per a given period, for example, 1,000 calls per day, the contracted call routing may be accomplished according to a variety of agreed upon parameters. For example, the third party call center may agree to process 100 calls per hour for ten hours. For another example, the call center may agree to process incoming services calls between the hours of 5:00 p.m. and midnight daily. For another example, the call center may agree to process calls according to certain lines of business, or calls originating from certain locations or areas in which the call centers operate.

On the side of the provider of goods or services requiring use of the third party call center, there may be a need to route calls to the third party call center at times of day when the internal call center 147 is not operating, or on days or during times when call volume exceeds the capabilities of the internal call center. If calls are routed to third party call centers when the internal call center is not operating, then every incoming service call may be routed in sequence to a specified third party call center. On the other hand, if the capabilities of the internal call center 147 only allow for processing to out of every three received calls during periods of high call volume, then the goods/services provider may need to route one out of every three incoming service calls to the third party call center up to a maximum number of agreed upon routed calls.

In the first case, there is a need for monitoring routed calls against the agreed upon maximum number of calls that may be routed without penalty to the third party call center. In the latter case, there may be a need for monitoring the Nth call count (for example, every fourth call) up to the maximum agreed upon number of routed calls to allow the goods/services provider to track and trend in a real time manner calls that are being routed to the third party call center in order to allow the goods/services provider to manage its utilization of the services of the third party call center.

According to embodiments, the call routing control application 135 may track each call routed to any call center including the internal call center 147 and including any of the third party call centers 150, 155, 160 along with information associated with routed calls, for example, associated line of business, current Nth call routing setting, for example, every four calls, every six calls, and the like, current maximum call routing setting, for example, 500 calls, current Nth call count, number of calls sent to a given call center, total number of calls processed by the call routing control application, percentage of total calls passed to a given call center, date/time associated with routed calls, and the like. By maintaining such data on routed calls, the call control application 135 may generate one or more call routing reports for review by personnel of the goods/services provider requiring call center functions so that the utilization of the internal call center 147 and any of the third party call centers 150, 155, 160 may be maximized.

According to embodiments, an application set up interface 145 may be provided by the call routing control application 135 via the CTI server 130 to allow personnel of the goods/services provider to make on-the-fly changes in call routing procedures and instructions based on real time and historical call routing data. For example, if it is reported by the call routing control application 135, as described below with reference to FIGS. 2 through 4, that one out of every three calls for a given line of business are being routed to a specified third party call center 150, but it is also determined that the personnel and systems of the internal call center 147 are being overloaded due to unusually high call volume, the application set up interface 145 may be utilized for changing routing instructions to alleviate the situation. For example, the application set up interface may be utilized to require that two out of every three calls received for the example line of business be routed to the third party call center 150 and that only one out of every three incoming calls be routed to the internal call center 147. Once the call routing procedure is thus changed via the application set up interface 145, all subsequent incoming calls directed to the example line of business will be routed to the internal call center 147 or the third party call center 150 according to the updated call routing instructions. Similarly, if it is determined that too many calls are being routed to a third party call center 150 and that the maximum number of calls that may be processed at the third party call center 150 without penalty is being approached, the application set up interface 145 may be utilized for temporarily routing all incoming calls to the internal call center 147 or to an alternate third party call center 155.

In addition to enabling changes to call routing instructions and procedures via the application set up interface 145, certain call routing instructions changes may be programmed via the call routing control application to occur automatically without user input. For example, if the maximum number of calls that may be passed to a third party call center 155 without penalty equals 1,000 calls, the call routing control application 135 may be programmed to automatically stop sending calls to the third party call center 155 when the maximum number is reached. Thus, the contracted number of calls that may be sent to the third party call center is maximized without incurring penalties for excess call routing. As should be appreciated, when a maximum number of calls to a given third party call center is reached, the call routing control application 135 may be programmed to automatically route future calls to a specified alternate call center including the internal call center 147 or another third party call center 150, 155, 160.

As should be appreciated then, for each incoming service call received at the automatic call distribution system 125, a query is passed to the CTI server 130 for call routing instructions. A return message from the CTI server 130 in association with the aforementioned functionality of the call routing control application 135 causes the automatic call distribution system 125 to route the incoming service call to the appropriate internal or third party call center.

Figure 2:
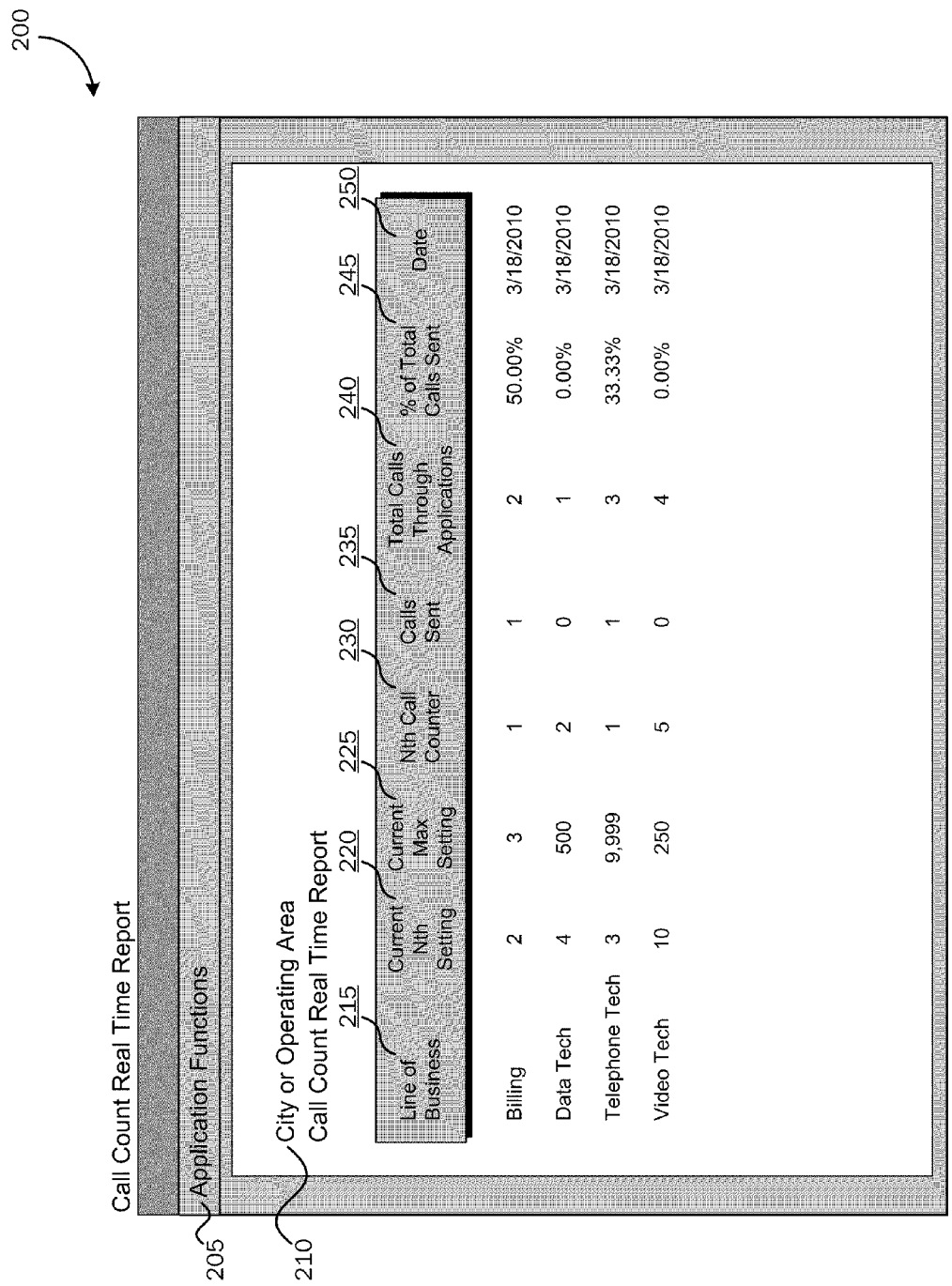
FIG. 2 illustrates an example computer-generated display of a real time call count report.

As described above, in addition to controlling the routing of incoming service calls to one or more specified call centers, the call routing control application 135 may generate one or more reports for allowing the receiving goods/services provider to monitor, trend, analyze and control service call routing. FIG. 2 illustrates an example computer-generated display of a real time call count report. The real time call count report 200 illustrated in FIG. 2 is generated and updated after each incoming service call is processed to allow personnel to review up-to-date real time information on calls routed to one or more call service centers by the ACD 125.

As illustrated in FIG. 2, the real time call count report 200 may include one or more application functions 205 for editing or otherwise manipulating data contained in the report 200. A city or operating area field 210 may provide a location, for example, New York City, Atlanta, Los Angeles, Southeast Region, and the like for data illustrated in the report 200. A number of data items, for example, line of business 215, current Nth setting, 220, current max setting 225, Nth call counter 230, calls sent 235, total calls through applications 240, percent of total calls sent 245, and date 250 may be provided for calls routed according to the call routing control application 135. For example, for the line of business type of telephone technology, a current Nth setting is illustrated as three calls. That is, every three calls received at the automatic control distribution system 125 are set for routing to a third party call center according to instructions provided by the call routing control application 135.

A current maximum setting of 9,999 calls is set as the maximum number of calls that may be routed to a specified third party call center. The Nth call counter 230 illustrates the current number of Nth calls processed, and the calls sent 235 illustrates that one call has been sent to the third party call center since the beginning of the call processing cycle with the third party call center. The total calls placed through all applications, for example, internal call center applications or other third party call center applications, illustrates a total of three, and the percent of total calls sent illustrates 33.33% to indicate that of the three total calls that have been passed through all call center applications, one call has been passed to the specified third party call center. The date field 250 illustrates the date associated with the currently displayed data. As should be appreciated, the data illustrated in the real time call count report 200 is for purposes of example only and is not limiting of the vast amount and types of data that may be displayed for routed service calls.

By use of the data contained in the real time call count report 200, personnel may make on-the-fly call routing decisions in order to properly utilize the capabilities and functions of internal call centers 147 and various third party call centers 150, 155, 160. For example, if it is determined from the real time report 200 that the percentage of total calls sent, for example, 33.33%, results in an under utilization of a given third party call center, personnel may utilize the application set up interface 145, as described above, to change the percent of total calls to be sent to the specified third party call center to a different number, for example, 50%, to cause more calls to be routed to the specified third party call center.

Referring now to FIG. 3, a call count executive summary report 300 is illustrated for providing summary information for calls routed to one or more call centers 147, 150, 155, and 160. Information about service calls routed to one or more internal or third party call centers may be summarized according to a specified period of time, for example, weekly, monthly, etc. For example, referring to FIG. 3 for the line of business of "Billing," information for three days worth of call routing is summarized under similar data headings as illustrated and described above with reference to FIG. 2. For example, for the line of business of "Billing," data for three days worth of call routing is illustrated. For the three days of data associated with calls routed to a third party calling center associated with the "billing" line of business, it can be seen that a maximum call routing limit was not reached on two of the days, but a maximum call limit was reached at a specified time on one of the days. In addition, the summary data illustrates that of the total calls passed through all available call center applications, the percentages of calls routed to the specified third party call center are illustrated for allowing personnel to consider call routing trends for better utilizing the services of internal and third party call centers on subsequent days. That is, use of the summary information contained in the call count executive summary report 300 allows personnel of the goods/services provider to determine appropriate call routing maximums that may be needed from one or more third party call centers, appropriate percentages of calls to be routed based on days and times of various call volumes, etc.

Figure 4:
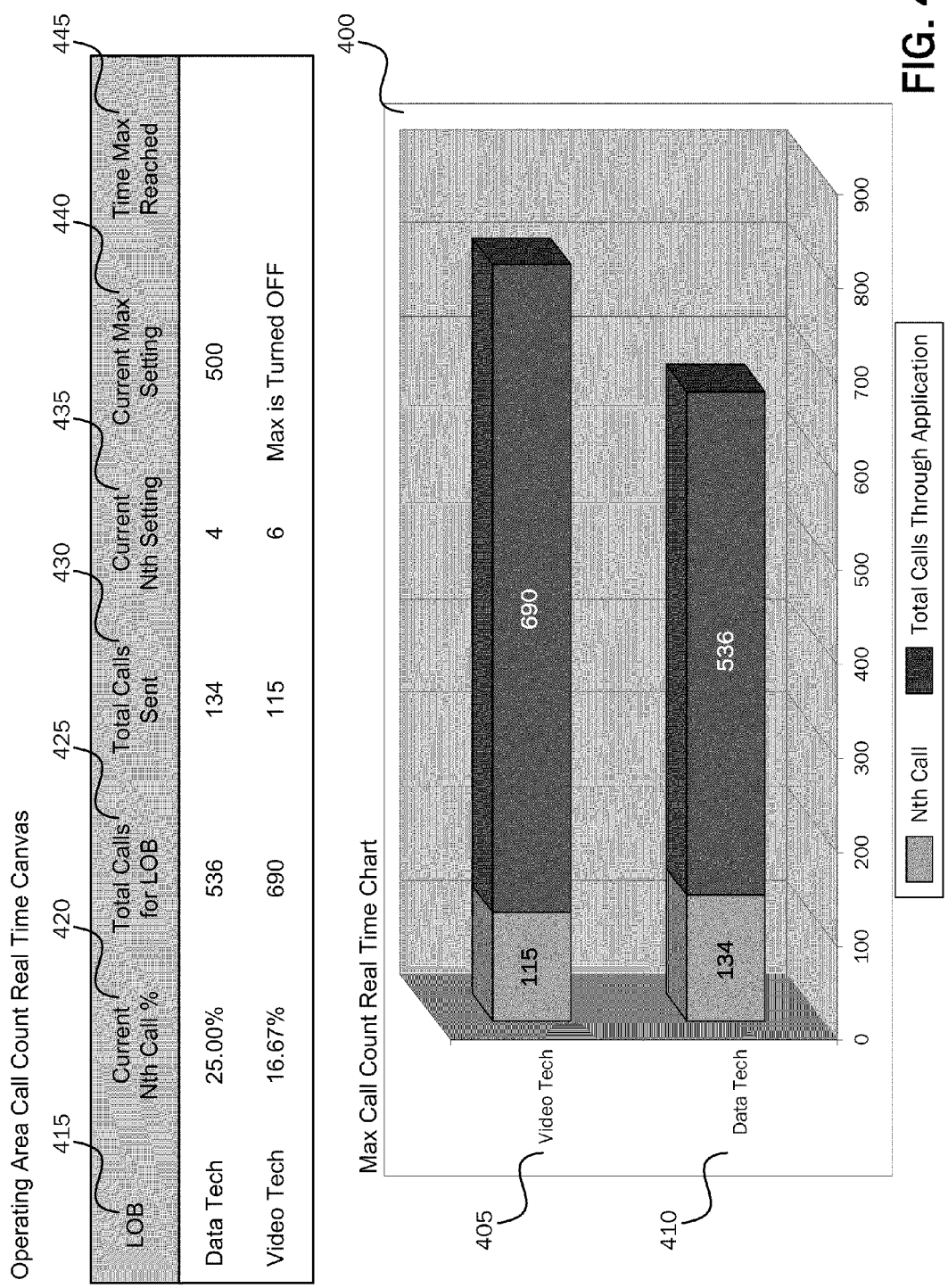
FIG. 4 illustrates an example computer-generated display of a real time call count canvas report.

As illustrated in FIG. 4, a call count real time canvas report 400 may be generated and provided to personnel of the goods/services provider for reviewing for any given line of business a real time graphical view of Nth call counts versus maximum call counts for a given line of business service calls that are routed to a given third party call center. As illustrated in the table above the graphical display, for the line of business of "Data Tech," the current Nth call percentage is 25%. That is, one out of every four calls received by the goods/service provider associated with data technology, are designated for routing to a third party call center. The total calls received for this example line of business is illustrated as 536 calls and the total calls sent to the third party call center is illustrated as 134 calls or 25% of the total number of calls. The current Nth call setting is set at 4 meaning that every fourth call received by the goods/services provider at its ACD 125 is routed to the third party call center. The example current maximum setting is designated as 500 calls that may be sent to the designated third party call center without incurring excess call routing penalties. Finally, the time maximum count is reached may illustrate the date and time at which the maximum number of calls sent to the third party call center is reached.

Referring to the graphical illustration below the data table in FIG. 4, a graphical display may be provided to the personnel of the goods/services provider to allow a quick view of the current Nth call count and the current total calls sent to the designated third party call center. For example referring to the "Data Tech" display 410, it can be readily determined that 134 calls have been sent to the third party call center of a total of 536 calls received for this line of business. According to an embodiment, at the call routing control application 135, the Nth count may be tracked and may be reset to zero when the Nth count is reached to ensure that the appropriate calls are sent according to the appropriate Nth count to maintain the appropriate percentage of calls to be sent. Thus, according to the example illustrated in FIG. 4 for "Data Tech," the Nth count will be reset to zero after each 4 counts, but the Nth count of 134 illustrated in the graphical display 400 illustrates the Nth count has been reached 134 times out of a total of 536 calls.

As with the reports illustrated in FIGS. 2 and 3, the real time call count canvas illustrated in FIG. 4 allows personnel of the goods/services provider to quickly and readily review the numbers of calls being sent to third party call centers in comparison to total numbers of calls being processed by one or more other call centers to allow goods/services provider personnel to efficiently manage call center utilization. As should be appreciated, the data illustrated in FIGS. 2, 3 and 4 may be illustrated for a single specified call center 147, 150, 155, 160, or information for a number of call centers may be illustrated in a single display for review by personnel of the goods/services provider.

Figure 5:
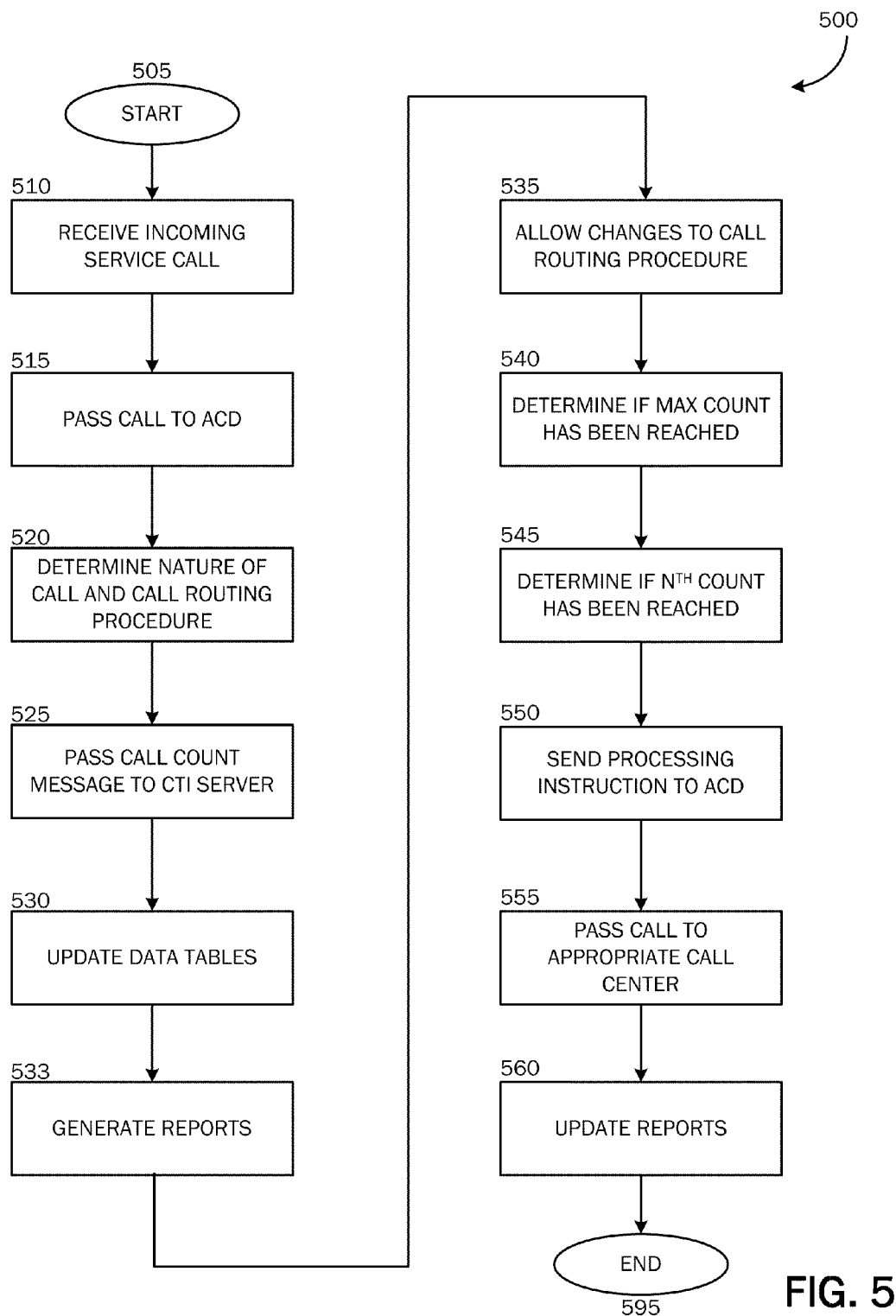
FIG. 5 illustrates a flow of a process for monitoring, reporting, and controlling call center call routing according to embodiments of the present invention.

Having described an operating environment for embodiments of the present invention and reports that may be generated from data associated with routed service calls, FIG. 5 illustrates a flow of a process for monitoring, reporting, and controlling call center call routing according to embodiments of the present invention. The method 500 begins at start operation 505 and proceeds to operation 510 where an incoming service call is received from one or more communications sources 105, 110, 115 and is passed to the automatic call distribution system 125 at operation 515.

At operation 520, a determination is made as to the nature of the call and call routing procedures. That is, based on information gathered about the incoming call at the ACD 125, the call routing control application 135 may determine the line of business associated with the incoming service call, the directory number associated with the incoming call, the date and time of the incoming call, the source location of the incoming call, and the like. At operation 525, a call count message is sent from the ACD 125 via a query to the CTI server 130 as illustrated in FIG. 1. As described above, the query is passed from the ACD 125 to the CTI server 130 to determine whether any special call routing processing instructions are to be applied to the presently received incoming service call.

Based on information obtained on the incoming call, the call routing control application 135 queries the data tables 140 for call routing information associated with the received incoming call. That is, the call routing control application 135 determines whether the incoming call should be routed to a specified third party call center as opposed to the internal call center, and call count information for call routing including maximum call numbers that may be routed to the specified third party call center and percentage call routing, if applicable, for example, the routing of every fourth call to the specified third party call center.

At operation 530, the data tables 140 are updated with any information associated with the present incoming call, for example, line of business, date and time of call, etc. At operation 533, any reporting updates required by the new information are automatically updated, for example, the real time call count report 200 may be automatically updated with information received for the incoming service call. At operation 535, any on-the-fly call routing procedure changes required by personnel of the goods/services provider may be performed via the application set up interface 145, as described above with reference to FIG. 1. For example, if the real-time reports generated in association with the incoming service call cause personnel of the goods/services provider to determine that call routing procedures should be changed, changes may be made via the application set up interface 145.

At operation 540, the call routing control application 135 determines whether the maximum call count for calls to be routed to a specified third party call center has been reached. If the maximum number of calls has been reached as a result of the presently received incoming service call, then the call routing control application 135 may automatically change call routing procedures to prevent subsequent calls from being routed to that third party call center. As should be appreciated, the call routing control application 135 may automatically route subsequent calls of this line of business to a different third party call center or to the internal call center 147. Alternatively, the call routing control application 135 may cause an alert or report update to be presented via the application set up interface 145 to allow personnel of the goods/services provider to manually make changes in the call routing procedures to forward subsequent calls of this line of business to a different call center if desired. If it is acceptable by personnel of the goods/services provider that additional calls exceeding the maximum number may be sent to the specified third party call center, then that instruction may be entered via the application set up interface 145.

At operation 545, the call routing control application 135 determines whether the Nth call count has been reached. For example, if the present call routing instruction requires that every fourth call received for a given line of business be routed to a specified third party call center, a determination is made at operation 545 as to whether the present incoming call is the fourth call in a series of incoming calls requiring that the present call be routed to the specified third party call center.

At operation 550, the call routing control application 135 passes an affirmative (ACK) or negative (NACK) acknowledgement message back to the ACD 125 to complete the call routing procedure. For example, if the call routing control application 135 passes an affirmative acknowledgement to the ACD 125, the call may be routed to the third party call center as designated. Alternatively, if the maximum count has been reached, or if it is determined that the present call should not be passed to the designated third party call center based on instructions provided via the application set up interface 145, then a negative acknowledgement may be sent back to the ACD 125 to direct the ACD 125 to route the presently received incoming service call to an alternate call center. At operation 560, the reports illustrated in FIGS. 2, 3 and 4 may be updated for presentation to personnel of the goods/services provider, as described above. The method 500 ends at operation 595.

As described herein, embodiments of the present invention are directed to monitoring, controlling, and reporting call center call routing. Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

I claim:

1. A method of managing service calls directed to a call center; comprising:
  receiving an incoming service call;
  determining whether the incoming service call includes information that specifies special call routing instructions to route the incoming service call to a specified call center for processing a particular line of business type;
  if the incoming service call includes information that specifies special call routing instructions for efficiently processing the particular line of business type, routing the incoming service call to the specified call center in accordance with the special call routing instructions to route the incoming service call to the specified call center;
  if the incoming service call includes information that specifies special call routing instructions, then:
    determining whether the incoming service call should be routed to a first call center for processing, includes parsing a database table associated with the incoming service call for information associated with the incoming service call to determine whether the incoming service call should be routed to the first call center for processing;
    determining a maximum number of incoming service calls to route to the first call center for processing;
    determining whether the maximum number of incoming service calls to route to the first call center has been reached;

if the maximum number of incoming service calls to route to the first call center has not been reached, routing the incoming service call to the first call center; and after routing the incoming service call to the first call center, incrementing in the database table a counter of calls routed to the first call center by one count and updating the database table associated with the incoming service call to indicate that the counter of calls routed to the first call center has been incremented by one count, wherein the call center is configured to make on-the-fly changes to call routing instructions based on real time and historical call routing data.

2. The method of claim 1, prior to determining whether the incoming service call should be routed to the first call center for processing, determining whether the incoming service call is designated for service call routing management.

3. The method of claim 2, wherein if the incoming service call is designated for service call routing management, querying a call routing control application for service call routing management instructions.

4. The method of claim 3, wherein querying the call routing control application for service call routing management instructions includes querying the call routing control application via a computer telephony integration (CTI) system.

5. The method of claim 1, wherein determining the maximum number of incoming service calls to route to the first call center for processing includes parsing the database table for information associated with the incoming service call to determine the maximum number of incoming service calls to route to the first call center for processing.

6. The method of claim 1, wherein receiving the incoming service call includes receiving the incoming service call at an automatic call distribution system.

7. The method of claim 6, prior to routing the incoming service call to the first call center, passing an instruction from a call routing control application to the automatic call distribution system for causing the automatic call distribution system to route the incoming service call to the first call center.

8. The method of claim 1, wherein if the maximum number of incoming service calls to route to the first call center has been reached, routing the incoming service call to a second call center.

9. The method of claim 8, wherein prior to routing the incoming service call to the second call center, parsing the database table for information associated with the incoming service call to determine the second call center for routing the incoming service call if the maximum number of incoming service calls to route to the first call center has been reached.

10. The method of claim 9, wherein routing the incoming service call to the second call center includes passing an instruction from a call routing control application to an automatic call distribution system for causing the automatic call distribution system to route the incoming service call to the second call center.

11. The method of claim 1, wherein after determining the maximum number of incoming service calls to route to the first call center for processing, receiving a percentage of the maximum number of incoming service calls to route to the first call center; and wherein routing the incoming service call to the first call center includes routing the incoming service call to the first call center if a total number of service calls routed to the first call center plus the incoming service call does not exceed the percentage of the maximum number of incoming service calls to route to the first call center.

12. The method of claim 11, wherein routing the incoming service call to the first call center if the total number of service calls routed to the first call center plus the incoming service call does not exceed the percentage of the maximum number of incoming service calls to route to the first call center includes routing every Nth service call directed to the first call center up to a number of calls equal to the percentage of the maximum number of incoming service calls to route to the first call center.

13. The method of claim 12, further comprising generating a real time canvas report showing routing information for one or more incoming service calls routed to the first call center, where the total number of service calls routed to the first call center is displayed graphically in association with a graphical display of the total number of service calls received that are of a same line of business type as the total number of service calls routed to the first call center.

14. The method of claim 1, further comprising generating a real time report showing routing information for the incoming service call, where the real time report is updated with the routing information for one or more additional incoming service calls routed to the first call center.

15. The method of claim 14, further comprising generating a summary report showing the routing information for a plurality of service calls routed to one or more call centers over a specified period of time.

16. A method of managing service calls directed to a call center; comprising:

receiving an incoming service call;

determining whether the incoming service call includes information that specifies special call routing instructions to route the incoming service call to a specified call center for processing a particular line of business type;

if the incoming service call includes information that specifies special call routing instructions for efficiently processing the particular line of business type, routing the incoming service call to the specified call center in accordance with the special call routing instructions to route the incoming service call to the specified call center;

if the incoming service call includes information that specifies special call routing instructions, then:

determining whether the incoming service call should be routed to a first call center for processing, includes parsing a database table associated with the incoming service call for information associated with the incoming service call to determine whether the incoming service call should be routed to the first call center for processing;

determining a maximum number of incoming service calls to route to the first call center for processing for processing;

receiving a percentage of the maximum number of incoming service calls to route to the first call center;

determining whether the maximum number of incoming service calls to route to the first call center has been reached; and if the maximum number of incoming service calls to route to the first call center or the specified call center has not been reached, routing the incoming service call to the first call center if a total number of service calls routed to the first call center plus the incoming service call does not exceed the percentage of the maximum number of incoming service calls to route to the first call center; and after routing the incoming service call to the first call center, incrementing in the database table a counter of calls routed to the first call center by one count and updating the database table associated with the incoming service call to indicate that the counter of calls routed to the first call center has been incremented by one count, wherein the call center is configured to make on-the-fly changes to call routing instructions based on real time and historical call routing data.

17. The method of claim 16, further comprising generating a real time canvas report showing routing information for one or more incoming service calls routed to the first call center, where the total number of service calls routed to the first call center is displayed graphically in association with a graphical display of the total number of service calls received that are of a same line of business type as the total number of service calls routed to the first call center.

18. The method of claim 16, wherein determining the maximum number of incoming service calls to route to the first call center for processing includes parsing the database table for information associated with the incoming service call to determine the maximum number of incoming service calls to route to the first call center for processing.

19. A system for managing service calls directed to a call center; comprising:

an automatic call distribution system operative
to receive an incoming service call;
to gather data on the incoming service call for determining a routing for the incoming service call;
to query a call routing control application for call routing instructions for the incoming service call;

the call routing control application operative
to determine whether the incoming service call includes information that specifies special call routing instructions to route the incoming service call to a specified call center for processing a particular line of business type;
if the incoming service call includes information that specifies special call routing instructions for efficiently processing the particular line of business type, to route the incoming service call to the specified call center in accordance with the special call routing instructions to route the incoming service call to the specified call center;
if the incoming service call includes information that specifies special call routing instructions, then:
to determine whether the incoming service call should be routed to a first call center for processing, including to parse a database table associated with the incoming service call for information associated with the incoming service call to determine whether the incoming service call should be routed to the first call center for processing;
to determine a maximum number of incoming service calls to route to the first call center;
to determine whether the maximum number of incoming service calls to route to the first call center has been reached;
to pass call routing instructions for the incoming service call to the automatic call distribution system; and the automatic call distribution system being further operative
to route the incoming service call to the first call center or the specified call center if the maximum number of incoming service calls to route to the first call center has not been reached or routing the incoming service call to the specified call center in accordance with the special call routing instructions to route the incoming service call to the specified call center; and
after routing the incoming service call to the first call center, to increment in the database table a counter of calls routed to the first call center by one count and updating the database table associated with the incoming service call to indicate that the counter of calls routed to the first call center has been incremented by one count,
wherein the call center is configured to make on-the-fly changes to call routing instructions based on real time and historical call routing data.

20. The system of claim 19, wherein determining the maximum number of incoming service calls to route to the first call center for processing includes parsing the database table for information associated with the incoming service call to determine the maximum number of incoming service calls to route to the first call center for processing.

* * * * *

UNITED STATES PATENT AND TRADEMARK OFFICE
CERTIFICATE OF CORRECTION

PATENT NO. : 8,638,920 B2  Page 1 of 1
APPLICATION NO. : 12/843277
DATED : January 28, 2014
INVENTOR(S) : Cutajar It is certified that error appears in the above-identified patent and that said Letters Patent is hereby corrected as shown below:

In the Claims

Col. 12, lines 51-52, claim 16: "call center for processing for processing;" should read --call center for processing--

Signed and Sealed this
Twentieth Day of January, 2015

Michelle K. Lee
*Deputy Director of the United States Patent and Trademark Office*